United States Patent
Cunningham et al.

(10) Patent No.: US 11,828,218 B2
(45) Date of Patent: Nov. 28, 2023

(54) SYSTEMS AND METHODS FOR MEASURING EXHAUST GAS SPECIES AND SCR CATALYST NOX STORAGE FOR SCR-RELATED CONTROLS AND DIAGNOSTICS

(71) Applicant: Cummins Inc., Columbus, IN (US)

(72) Inventors: Michael J. Cunningham, Greenwood, IN (US); Neal W. Currier, Columbus, IN (US); Saurabh Yashwant Joshi, Columbus, IN (US); Antonius Padua Nusawardhana, Columbus, IN (US); Aleksey Yezerets, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/592,770

(22) Filed: Feb. 4, 2022

(65) Prior Publication Data
US 2022/0154615 A1   May 19, 2022

Related U.S. Application Data

(63) Continuation of application No. PCT/US2020/045143, filed on Aug. 6, 2020.
(Continued)

(51) Int. Cl.
*F01N 3/20*   (2006.01)
*F01N 9/00*   (2006.01)
(Continued)

(52) U.S. Cl.
CPC .......... *F01N 3/208* (2013.01); *F01N 3/2006* (2013.01); *F01N 9/005* (2013.01); *F01N 3/022* (2013.01);
(Continued)

(58) Field of Classification Search
CPC combination set(s) only.
See application file for complete search history.

(56) References Cited

U.S. PATENT DOCUMENTS 8,109,079 B2   2/2012   Wills et al.
8,333,062 B2   12/2012  Sun
(Continued)

FOREIGN PATENT DOCUMENTS

WO   WO-2016/068867 A1   5/2016

OTHER PUBLICATIONS

Foreign Action other than Search Report on PCT PCT/US2020/045143 dated Feb. 17, 2022.
(Continued)

*Primary Examiner* — Binh Q Tran
(74) *Attorney, Agent, or Firm* — Foley & Lardner LLP

(57) ABSTRACT

Systems, apparatuses, and methods include a controller for an exhaust aftertreatment system including a SCR catalyst in exhaust gas-receiving communication with an engine and at least one reductant dosing system structured to provide reductant to the exhaust gas. The controller is structured to determine a concentration of one or more of NO and $NO_2$ at or proximate an inlet of the exhaust aftertreatment system and based on a dynamic model of the SCR catalyst, information indicative of a concentration of NOx at or proximate an outlet of the exhaust aftertreatment system, and information indicative of an amount of stored reductant in the SCR catalyst. The controller is further structured to command the at least one reductant doser to increase, decrease, or maintain an amount of reductant provided to the exhaust gas based on the determined concentration of one or more of NO and $NO_2$ in the exhaust gas.

20 Claims, 3 Drawing Sheets

Related U.S. Application Data

(60) Provisional application No. 62/883,925, filed on Aug. 7, 2019.

(51) Int. Cl.
  *F01N 3/10* (2006.01)
  *F01N 3/08* (2006.01)
  *F01N 3/025* (2006.01)
  *F01N 3/023* (2006.01)
  *F01N 3/022* (2006.01)

(52) U.S. Cl.
  CPC ............ *F01N 3/023* (2013.01); *F01N 3/0253* (2013.01); *F01N 3/0821* (2013.01); *F01N 3/101* (2013.01); *F01N 9/002* (2013.01); *F01N 2250/02* (2013.01); *F01N 2330/06* (2013.01); *F01N 2370/24* (2013.01); *F01N 2510/068* (2013.01); *F01N 2510/0682* (2013.01); *F01N 2560/026* (2013.01); *F01N 2570/14* (2013.01); *F01N 2610/02* (2013.01); *F01N 2610/146* (2013.01); *F01N 2900/1402* (2013.01); *F01N 2900/1818* (2013.01)

(56) References Cited

U.S. PATENT DOCUMENTS

| | | |
|---|---|---|
| 8,420,036 B1 | 4/2013 | Miwa |
| 8,474,248 B2 | 7/2013 | Sun et al. |
| 9,133,749 B2 | 9/2015 | Gady et al. |
| 9,435,244 B1 | 9/2016 | Devarakonda |
| 9,803,532 B2 | 10/2017 | Li et al. |
| 2009/0301066 A1* | 12/2009 | Sindano ............... F01N 3/208 60/297 |
| 2010/0281855 A1 | 11/2010 | Sun et al. |
| 2011/0047970 A1 | 3/2011 | Yezerets et al. |
| 2012/0006004 A1* | 1/2012 | Tai ............... F01N 3/208 60/274 |
| 2012/0222404 A1 | 9/2012 | Charial et al. |
| 2012/0227383 A1* | 9/2012 | Charial ............... F01N 3/208 60/274 |
| 2013/0064717 A1* | 3/2013 | Masaki ............... F01N 3/18 422/108 |
| 2014/0223886 A1 | 8/2014 | Khaled et al. |
| 2015/0096287 A1 | 4/2015 | Qi |
| 2016/0169073 A1* | 6/2016 | Chanzy ............... F01N 3/206 60/274 |
| 2016/0333760 A1 | 11/2016 | Blomgren et al. |
| 2017/0002709 A1* | 1/2017 | Mikami ............. B01D 53/9418 |
| 2017/0114690 A1 | 4/2017 | Gupta et al. |
| 2017/0122159 A1 | 5/2017 | Bahrami |
| 2018/0142593 A1 | 5/2018 | Wang et al. |
| 2018/0274417 A1* | 9/2018 | Mao ............... F01N 9/005 |
| 2019/0345861 A1* | 11/2019 | Johansson ............... F01N 3/206 |

OTHER PUBLICATIONS

IN First Examination Report for Indian Application No. IN 202247007830 dated Mar. 14, 2022, 7 pages.

International Search Report and Written Opinion on International Application No. PCT/US2020/045143, dated Nov. 19, 2020, 14 pages.

Supplementary European Search Report on EP App. No. 20850769.9 dated Jan. 20, 2023.

* cited by examiner

SYSTEMS AND METHODS FOR MEASURING EXHAUST GAS SPECIES AND SCR CATALYST NOX STORAGE FOR SCR-RELATED CONTROLS AND DIAGNOSTICS

CROSS-REFERENCE TO RELATED APPLICATIONS

This application is a continuation of International Application No. PCT/US2020/045143, filed Aug. 6, 2020, which claims the benefit of U.S. Provisional Patent Application No. 62/883,925 filed Aug. 7, 2019, both of which are incorporated herein by reference in their entireties.

TECHNICAL FIELD

The present disclosure relates to systems and methods for analyzing the chemical composition of engine exhaust gas in an engine exhaust aftertreatment system. More particularly, the present disclosure relates to systems and methods for controlling and diagnosing components of the exhaust aftertreatment system based on the chemical composition of the exhaust gas.

BACKGROUND

Emissions regulations for internal combustion engines have become more stringent over recent years. Environmental concerns have motivated the implementation of stricter emission requirements for internal combustion engines throughout much of the world. Government agencies, such as the Environmental Protection Agency (EPA) in the United States, carefully monitor the emission quality of engines and set emission standards to which engines must comply. Consequently, the use of exhaust aftertreatment systems to treat engine exhaust gas to reduce emissions is increasing.

Exhaust aftertreatment systems are generally designed to reduce emission of particulate matter, nitrogen oxides (NOx), hydrocarbons, and other environmentally harmful pollutants. Exhaust aftertreatment systems treat engine exhaust gas with catalysts and reductant to convert NOx in the exhaust gas into less harmful compounds. An amount of reductant injected into the exhaust gas is carefully managed for effective conversion of NOx in the exhaust gas into less harmful compounds. For example, injecting insufficient reductant into the exhaust gas can result in an increase in NOx concentration in exhaust gas leaving the aftertreatment system. Injecting excess reductant into the exhaust gas can cause unreacted reductant to be present in the exhaust gas leaving the aftertreatment system.

SUMMARY

One embodiment relates to a system. The system includes an exhaust aftertreatment system and a controller. The exhaust aftertreatment system includes a selective catalytic reduction (SCR) catalyst in exhaust gas-receiving communication with an engine and at least one reductant dosing system structured to provide reductant to the exhaust gas. The controller is structured to determine a concentration of one or more of nitric oxide (NO) and nitrogen dioxide ($NO_2$) at or proximate an inlet of the exhaust aftertreatment system based on a dynamic model of the SCR catalyst, information indicative of a concentration of nitrous oxide (NOx) at or proximate an outlet of the exhaust aftertreatment system, and information indicative of an amount of stored reductant in the SCR catalyst. The controller is structured to command the at least one reductant doser to increase, decrease, or maintain an amount of reductant provided to the exhaust gas based on the determined concentration of one or more of NO and $NO_2$ in the exhaust gas.

One embodiment relates to an apparatus. The apparatus includes an exhaust analysis circuit and a reductant delivery circuit. The exhaust analysis circuit is structured to determine a concentration of one or more of nitric oxide (NO) and nitrogen dioxide ($NO_2$) at or proximate an inlet of an exhaust aftertreatment system based on a dynamic model of a selective catalytic reduction (SCR) catalyst of the exhaust aftertreatment system, information indicative of a concentration of nitrous oxide (NOx) at or proximate an outlet of the exhaust aftertreatment system, and information indicative of an amount of stored reductant in the SCR catalyst. The exhaust aftertreatment system includes the selective catalytic reduction (SCR) catalyst in exhaust gas-receiving communication with an engine and at least one reductant dosing system structured to provide reductant to the exhaust gas. The reductant delivery circuit is structured to command the at least one reductant doser to increase, decrease, or maintain an amount of reductant provided to the exhaust gas based on the determined concentration of one or more of NO and $NO_2$ in the exhaust gas.

One embodiment relates to a method. The method includes determining a concentration of one or more of nitric oxide (NO) and nitrogen dioxide ($NO_2$) at or proximate an inlet of an exhaust aftertreatment system including a selective catalytic reduction (SCR) catalyst in exhaust gas-receiving communication with an engine and at least one reductant dosing system structured to provide reductant to the exhaust gas based on a dynamic model of the SCR catalyst, information indicative of a concentration of nitrous oxide (NOx) at or proximate an outlet of the exhaust aftertreatment system, and information indicative of an amount of stored reductant in the SCR catalyst. The method includes commanding the at least one reductant doser to increase, decrease, or maintain an amount of reductant provided to the exhaust gas based on the determined concentration of one or more of NO and $NO_2$ in the exhaust gas.

These and other features, together with the organization and manner of operation thereof, will become apparent from the following detailed description when taken in conjunction with the accompanying drawings.

DETAILED DESCRIPTION

Figure 1:
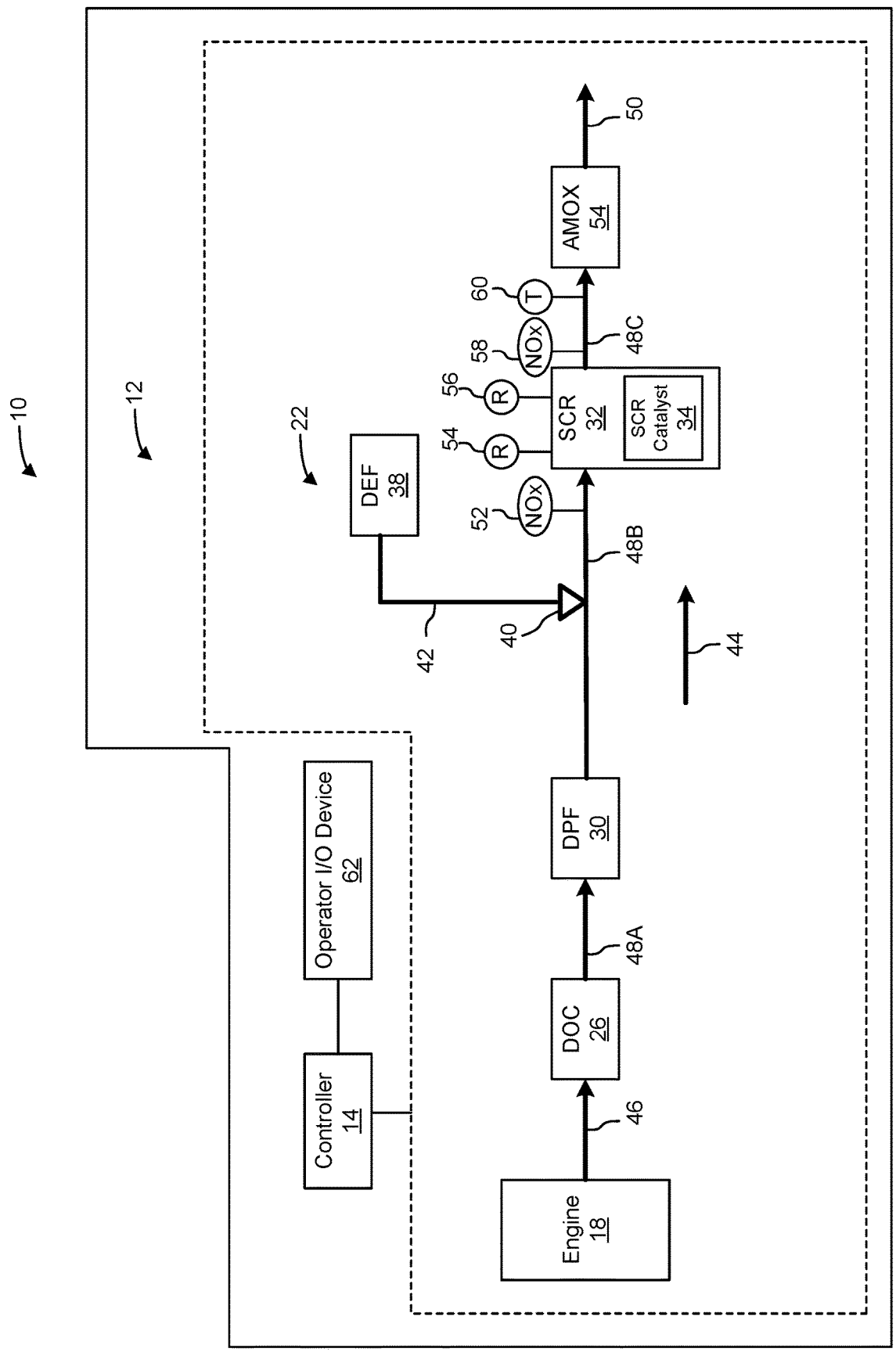
FIG. 1 is a schematic diagram of an exhaust aftertreatment system with a controller, according to an example embodiment.

Following below are more detailed descriptions of various concepts related to, and implementations of, methods, apparatuses, and systems for determining the nitric oxide (NO), nitrogen dioxide ($NO_2$), and reductant concentrations in engine exhaust gas and the amount of reductant bound to a selective catalytic reduction (SCR) catalyst of an exhaust aftertreatment system based on a dynamic model of the SCR catalyst and controlling reductant dosing based on the NO, $NO_2$, and reductant concentrations in the exhaust gas and the amount of reductant bound to the SCR catalyst. The various concepts introduced above and discussed in greater detail below may be implemented in any number of ways, as the concepts described are not limited to any particular manner of implementation. Examples of specific implementations and applications are provided primarily for illustrative purposes.

Exhaust aftertreatment systems are structured to receive exhaust emitted by an engine and convert nitrogen oxides (NOx), which include NO and $NO_2$, in the exhaust gas into less harmful compounds. The exhaust aftertreatment systems often include reductant dosers structured to inject reductant such as urea or diesel exhaust fluid (DEF) into the exhaust gas upstream of the SCR catalyst. The reductant reacts with NOx in the exhaust gas in the SCR catalyst to reduce the NOx into less harmful compounds. The amount of reductant injected into the exhaust gas is closely managed so that substantially all of the reductant injected into the exhaust gas reacts with the NOx in the exhaust gas and is consumed. In conditions in which excess reductant is injected into the exhaust gas, a portion of the reductant is not consumed before the exhaust gas exits the tailpipe of the vehicle. This presence of reductant in the exhaust leaving the vehicle is referred to as "reductant slip."

Vehicle control systems determine an amount of reductant to inject into the exhaust aftertreatment system based on a NOx concentration in the exhaust gas, which can be sensed by a NOx sensor positioned in the exhaust aftertreatment system near the engine. NOx sensors are structured to sense both NO and $NO_2$, but the NOx sensors cannot distinguish between NO and $NO_2$, and instead sense a combined concentration of NO and $NO_2$ in the exhaust gas. Therefore, it would be advantageous to determine the concentrations of NO and $NO_2$ individually in the exhaust gas at, proximate, or upstream of the SCR catalyst to more effectively control reductant delivery to the exhaust gas.

Referring to the figures generally, the various embodiments disclosed herein relate to systems, apparatuses, and methods for determining the NO, $NO_2$, and reductant concentrations in the exhaust gas and the amount of reductant bound to the SCR catalyst based on a dynamic model of the SCR catalyst and controlling reductant dosing based on the NO, $NO_2$, and reductant concentrations in the exhaust gas and the amount of reductant bound to the SCR catalyst.

Referring now to FIG. 1, a vehicle 10 having an engine system 12 including a controller 14 is shown, according to an example embodiment. As shown in FIG. 1, the engine system 12 includes an internal combustion engine, shown as engine 18, and an aftertreatment system, shown as exhaust aftertreatment system 22. The exhaust aftertreatment system 22 is in exhaust gas-receiving communication with the engine 18. According to one embodiment, the engine 18 is structured as a compression-ignition internal combustion engine that utilizes diesel fuel. However, in various alternate embodiments, the engine 18 may be structured as any other type of engine (e.g., spark-ignition) that utilizes any type of fuel (e.g., gasoline, natural gas). Within the engine 18, air from the atmosphere is combined with fuel, and combusted, to power the engine 18. Combustion of the fuel and air in the compression chambers of the engine 18 produces exhaust gas that is operatively vented to an exhaust manifold and to the exhaust aftertreatment system 22.

In the example depicted, the exhaust aftertreatment system 22 includes a diesel oxidation catalyst (DOC) 26, a diesel particulate filter (DPF) 30, a selective catalytic reduction (SCR) system 32 with a SCR catalyst 34, and an ammonia oxidation (AMOx) catalyst 36. The SCR system 32 further includes a reductant delivery system that has a reductant source, shown as diesel exhaust fluid (DEF) source 38, that supplies reductant (e.g., DEF, ammonia) to a reductant doser 40, via a reductant line, shown as reductant line 42. It should be noted that the components of the exhaust aftertreatment system 22 may be in any order, or different components and/or a different aftertreatment architecture may be used. In another example, the SCR system 32 may include multiple reductant dosers 40 positioned along the exhaust aftertreatment system 22. Although the exhaust aftertreatment system 22 shown includes one of the DOC 26, the DPF 30, the SCR catalyst 34, and the AMOx catalyst 36 positioned in specific locations relative to each other along the exhaust flow path, in other embodiments, the exhaust aftertreatment system 22 may include more than one of any of the various catalysts positioned in any of various positions relative to each other along the exhaust flow path as desired. Therefore, the architecture of the exhaust aftertreatment system 22 shown in FIG. 1 is for illustrative purposes and should not be limiting.

In an exhaust flow direction, as indicated by directional arrow 44, exhaust gas flows from the engine 18 into inlet piping 46 of the exhaust aftertreatment system 22. From the inlet piping 46, the exhaust gas flows into the DOC 26 and exits the DOC 26 into a first section of exhaust piping 48A. From the first section of exhaust piping 48A, the exhaust gas flows into the DPF 30 and exits the DPF 30 into a second section of exhaust piping 48B. From the second section of exhaust piping 48B, the exhaust gas flows into the SCR catalyst 34 and exits the SCR catalyst 34 into a third section of exhaust piping 48C. As the exhaust gas flows through the second section of exhaust piping 48B, it may be periodically dosed with reductant (e.g., DEF, urea) by the reductant doser 40. Accordingly, the second section of exhaust piping 48B may act as a decomposition chamber or tube to facilitate the decomposition of the reductant to ammonia. From the third section of exhaust piping 48C, the exhaust gas flows into the AMOx catalyst 36 and exits the AMOx catalyst 36 into outlet piping 50 before the exhaust gas is expelled from the exhaust aftertreatment system 22. Based on the foregoing, in the illustrated embodiment, the DOC 26 is positioned upstream of the DPF 30, the DPF 30 is positioned upstream of the SCR catalyst 34, and the SCR catalyst 34 is positioned upstream of the AMOx catalyst 36. However, in alternative embodiments, other arrangements of the components of the exhaust aftertreatment system 22 are also possible.

The DOC 26 may have any of various flow-through designs. Generally, the DOC 26 is structured to oxidize at least some particulate matter, e.g., the soluble organic fraction of soot, in the exhaust and reduce unburned hydrocarbons and carbon monoxide (CO) in the exhaust to less environmentally harmful compounds. For example, the DOC 26 may be structured to reduce the hydrocarbon and CO concentrations in the exhaust to meet the requisite emissions standards for those components of the exhaust gas. An indirect consequence of the oxidation capabilities of the DOC 26 is the ability of the DOC 26 to oxidize NO into $NO_2$. In this manner, the level of $NO_2$ the DOC 26 is equal to the $NO_2$ in the exhaust gas generated by the engine 18 plus the $NO_2$ converted from NO by the DOC 26.

In addition to treating the hydrocarbon and CO concentrations in the exhaust gas, the DOC 26 may also be used in the controlled regeneration of the DPF 30, the SCR catalyst 34, and the AMOx catalyst 36. This can be accomplished through the injection, or dosing, of unburned HC into the exhaust gas upstream of the DOC 26. Upon contact with the DOC 26, the unburned HC undergoes an exothermic oxidation reaction which leads to an increase in the temperature of the exhaust gas exiting the DOC 26 and subsequently entering the DPF 30, the SCR catalyst 34, and/or the AMOx catalyst 36. The amount of unburned HC added to the exhaust gas is selected to achieve the desired temperature increase or target controlled regeneration temperature.

The DPF 30 may be any of various flow-through or wall-flow designs, and is structured to reduce particulate matter concentrations, e.g., soot and ash, in the exhaust gas to meet or substantially meet requisite emission standards. The DPF 30 captures particulate matter and other constituents, and thus may need to be periodically regenerated to burn off the captured constituents. Additionally, the DPF 30 may be structured to oxidize NO to form $NO_2$ independent of the DOC 26.

As discussed above, the SCR system 32 may include a reductant delivery system with a reductant (e.g., DEF) source 38, a pump, and a delivery mechanism or doser 40. The reductant source 38 can be a container or tank capable of retaining a reductant, such as, for example, ammonia (NH3), DEF (e.g., urea), or diesel oil. The reductant source 38 is in reductant supplying communication with the pump, which is structured to pump reductant from the reductant source 38 to the doser 40 via a reductant delivery line 42. The doser 40 may be positioned upstream of the SCR catalyst 34. The doser 40 is selectively controllable to inject reductant directly into the exhaust gas prior to entering the SCR catalyst 34. In some embodiments, the reductant may either be ammonia or DEF, which decomposes to produce ammonia. As briefly described above, the ammonia reacts with NOx in the presence of the SCR catalyst 34 to reduce the NOx to less harmful emissions, such as $N_2$ and $H_2O$. The NOx in the exhaust gas includes $NO_2$ and NO. Generally, both $NO_2$ and NO are reduced to $N_2$ and $H_2O$ through various chemical reactions driven by the catalytic elements of the SCR catalyst 34 in the presence of reductant such as $NH_3$.

The SCR catalyst 34 may be any of various catalysts known in the art. For example, in some implementations, the SCR catalyst 34 is a vanadium-based catalyst, and in other implementations, the SCR catalyst 34 is a zeolite-based catalyst, such as a Cu-Zeolite or a Fe-Zeolite catalyst. The SCR catalyst 34 is configured to bind the reductant in the exhaust gas and facilitate reactions between the bound reductant and NOx in the exhaust gas to reduce the NOx in the exhaust gas into less harmful compounds.

The AMOx catalyst 36 may be any of various flow-through catalysts structured to react with ammonia to produce mainly nitrogen. As briefly described above, the AMOx catalyst 36 is structured to remove ammonia that has slipped through or exited the SCR catalyst 34 without reacting with NOx in the exhaust. In certain instances, the exhaust aftertreatment system 22 may be operable with or without the AMOx catalyst 36. Further, although the AMOx catalyst 36 is shown as a separate unit from the SCR catalyst 34 in FIG. 1, in some implementations, the AMOx catalyst 36 may be integrated with the SCR catalyst 34, e.g., the AMOx catalyst 36 and the SCR catalyst 34 may be located within the same housing. According to the present disclosure, the SCR catalyst 34 and the AMOx catalyst 36 are positioned serially, with the SCR catalyst 34 preceding the AMOx catalyst 36. As described above, in various other embodiments, the AMOx catalyst 36 is not included in the exhaust aftertreatment system 22.

Referring still to FIG. 1, the exhaust aftertreatment system 22 may include various sensors, such as NOx sensors, oxygen sensors, temperature sensors, reductant sensors, pressure sensors, flow rate sensors, and so on. The various sensors may be strategically disposed throughout the exhaust aftertreatment system 22 and may be in communication with the controller 14 to monitor operating conditions of the exhaust aftertreatment system 22 and/or the engine 18. As shown in FIG. 1, the exhaust aftertreatment system 22 includes a first NOx sensor 52 positioned at or upstream of the inlet of the SCR catalyst 34, a first bound reductant sensor 54 positioned at or proximate of an inlet of the SCR catalyst 34, a second bound reductant sensor 56 positioned at or proximate of an outlet of the SCR catalyst 34, a second NOx sensor 58 positioned at or downstream of the outlet of the SCR catalyst 34, and a temperature sensor 60 positioned at or downstream of an outlet of the exhaust aftertreatment system 22. In some embodiments, the second NOx sensor can be positioned at or downstream of the outlet of the exhaust aftertreatment system 22.

The first NOx sensor 52 is structured to determine information indicative of a NOx concentration of the exhaust gas entering the exhaust aftertreatment system 22. The first bound reductant sensor 54 and the second bound reductant sensor 56 are structured to determine information indicative of an amount of reductant bound to the SCR catalyst 34. In some embodiments, the first bound reductant sensor 54 and the second bound reductant sensor 56 are radiofrequency (RF) sensors. The second NOx sensor 58 is structured to determine information indicative of an outlet NOx concentration. As used herein, "outlet NOx concentration" means the NOx concentration of the exhaust gas exiting the SCR catalyst 34 or the exhaust aftertreatment system 22. The temperature sensor 60 is structured to determine information indicative of a temperature of the exhaust gas exiting the exhaust aftertreatment system 22. While FIG. 1 depicts several sensors (e.g., first NOx sensor 52, first bound reductant sensor 54, second bound reductant sensor 56, second NOx sensor 58, temperature sensor 60), it should be understood that one or more of these sensors may be replaced by virtual sensor(s) in other embodiments. In this regard, the NOx amount at various locations may be estimated, determined, or otherwise correlated with various operating conditions of the engine 18 and exhaust aftertreatment system 22.

FIG. 1 is also shown to include an operator input/output (I/O) device 62. The operator I/O device 62 is communicably coupled to the controller 14, such that information may be exchanged between the controller 14 and the operator I/O device 62, wherein the information may relate to one or more components of FIG. 1 or determinations (described below) of the controller 14. The operator I/O device 62 enables an operator of the engine system 12 to communicate with the controller 14 and one or more components of the engine system 12 of FIG. 1. For example, the operator I/O device 62 may include, but is not limited to, an interactive display, a touchscreen device, one or more buttons and switches, voice command receivers, etc. In various alternate embodiments, the controller 14 and components described herein may be implemented with non-vehicular applications (e.g., a power generator). Accordingly, the operator I/O device 62 may be specific to those applications. For example, in those instances, the operator I/O device 62 may include a laptop computer, a tablet computer, a desktop computer, a phone, a watch, a personal digital assistant, etc. Via the operator I/O device 62, the controller 14 may display provide a determined a concentration of one or more of nitric oxide (NO) in the exhaust gas, nitrogen dioxide ($NO_2$) in the exhaust gas, reductant in the exhaust gas, and an amount of reductant bound to the SCR catalyst 34 at or proximate the inlet or the outlet of the SCR catalyst 34. Via the operator I/O device 62, the controller 14 may provide diagnostic information, a fault or service notification based on the determined concentration of one or more of the NO concentration in the exhaust, $NO_2$ concentration in the exhaust gas, the reductant concentration in the exhaust gas, and the amount of reductant bound to the SCR catalyst at or proximate the inlet or the outlet of the exhaust aftertreatment system 22.

The controller 14 is structured to control the operation of the engine system 12 and associated sub-systems, such as the internal combustion engine 18 and the exhaust aftertreatment system 22. According to one embodiment, the components of FIG. 1 are embodied in a vehicle 10. The vehicle may include an on-road or an off-road vehicle including, but not limited to, line-haul trucks, mid-range trucks (e.g., pick-up trucks), cars, boats, tanks, airplanes, and any other type of vehicle that utilizes an exhaust aftertreatment system. In various alternate embodiments, as described above, the controller 14 may be used with any engine-exhaust aftertreatment system (e.g., a stationary power generation system).

Components of the vehicle 10 may communicate with each other or foreign components using any type and any number of wired or wireless connections. For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections. Because the controller 14 is communicably coupled to the systems and components in the vehicle 10 of FIG. 1, the controller 14 is structured to receive data regarding one or more of the components shown in FIGS. 1 and 2. For example, the data may include operation data regarding the operating conditions of the engine 18, the reductant doser 40, the SCR catalyst 34 and/or other components (e.g., a battery system, a motor, a generator, a regenerative braking system) acquired by one or more sensors.

As the components of FIG. 1 are shown to be embodied in the engine system, the controller 14 may be structured as one or more electronic control units (ECU). The controller 14 may be separate from or included with at least one of a transmission control unit, an exhaust aftertreatment control unit, a powertrain control circuit, an engine control circuit, etc. The function and structure of the controller 14 is described in greater detail in FIG. 2.

The operator I/O device 62 may enable an operator of the vehicle 10 (or passenger or manufacturing, service, or maintenance personnel) to communicate with the vehicle 10 and the controller 14. By way of example, the operator I/O device 62 may include, but is not limited to, an interactive display, a touchscreen device, one or more buttons and switches, voice command receivers, and the like. In one embodiment, the operator I/O device 62 may display fault indicators to the operator of the vehicle.

Figure 2:
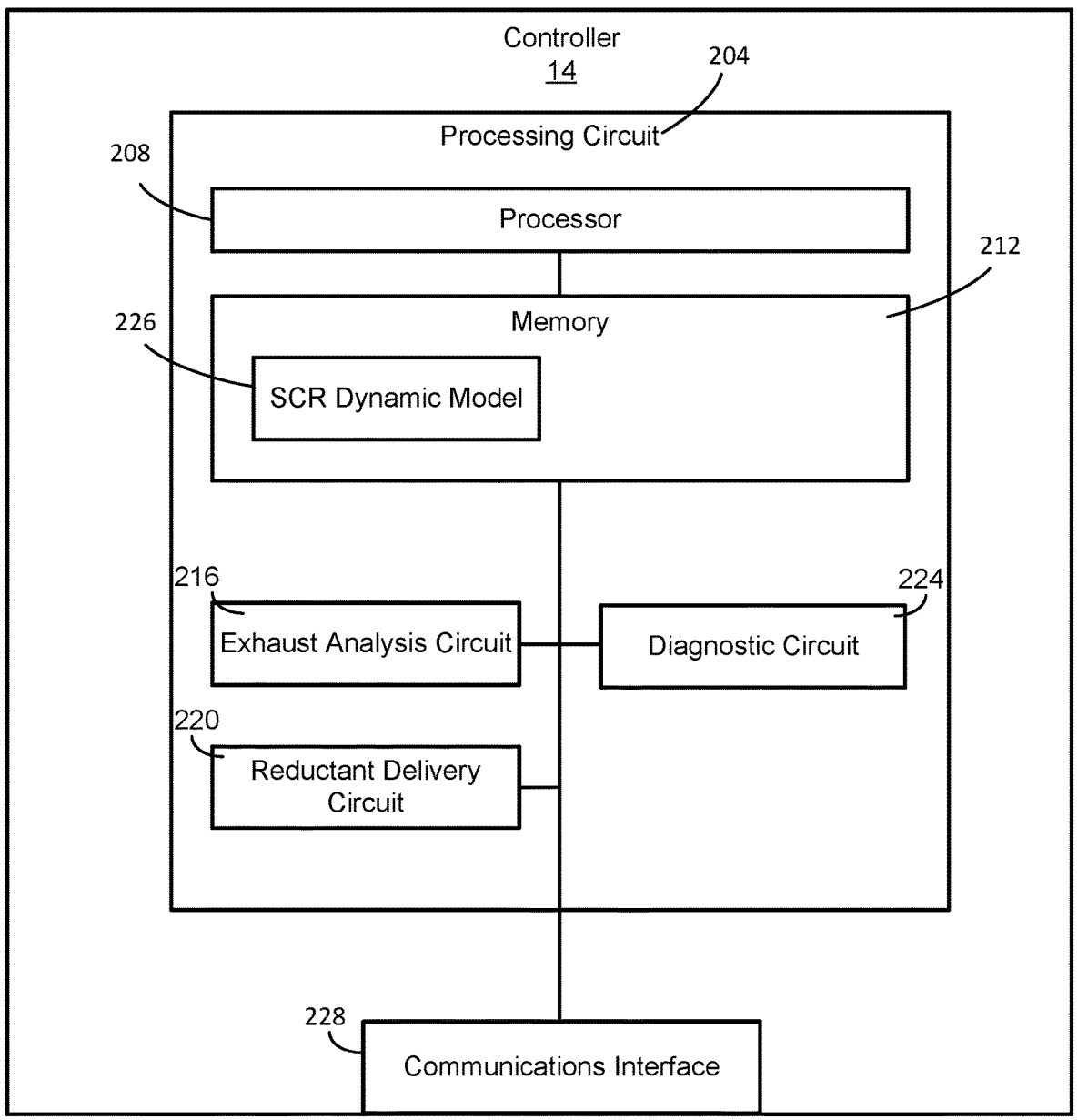
FIG. 2 is a schematic diagram of the controller of the system of FIG. 1 according to an example embodiment.

As the components of FIGS. 1-2 are shown to be embodied in the vehicle 10, the controller 14 may be structured as one or more electronic control units (ECU). As such, the controller 14 may be separate from or included with at least one of a transmission control unit, an exhaust aftertreatment control unit, a powertrain control circuit, an engine control circuit, etc. The function and structure of the controller 14 is described in greater detail in FIG. 2.

Referring now to FIG. 2, a schematic diagram of the controller 14 of the vehicle 10 of FIG. 1 is shown according to an example embodiment. As shown in FIG. 2, the controller 14 includes a processing circuit 204 having a processor 208 and a memory device 212, an exhaust analysis circuit 216, a reductant delivery circuit 220, a diagnostic circuit 224, and the communications interface 228. The memory device 212 includes a dynamic model 226 of the SCR 34. Generally, the controller 14 is structured to determine, based on information indicative of a NOx concentration and an amount of reductant bound to the SCR catalyst 34, the concentration of NO, $NO_2$, and reductant in the exhaust gas, and an amount of reductant bound to the SCR catalyst 34. In some embodiments, the controller 14 is structured to control an amount of reductant injected into the exhaust aftertreatment system based on the determined NO, $NO_2$, and reductant concentrations in the exhaust gas and the amount of reductant bound to the SCR catalyst 34. In some embodiments, the controller 14 is structured to determine diagnostic information based on based on the determined NO, $NO_2$, and reductant concentrations in the exhaust gas and the amount of reductant bound to the SCR catalyst 34.

In one configuration, the exhaust analysis circuit 216, the reductant delivery circuit 220, and the diagnostic circuit 224 are embodied as machine or computer-readable media that is executable by a processor, such as processor 208. As described herein and amongst other uses, the machine-readable media facilitates performance of certain operations to enable reception and transmission of data. For example, the machine-readable media may provide an instruction (e.g., command) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus).

In another configuration, the exhaust analysis circuit 216, the reductant delivery circuit 220, and the diagnostic circuit 224 may be embodied as one or more circuitry components including, but not limited to, processing circuitry, network interfaces, peripheral devices, input devices, output devices, sensors, etc. In some embodiments, the exhaust analysis circuit 216, the reductant delivery circuit 220, and the diagnostic circuit 224 may take the form of one or more analog circuits, electronic circuits (e.g., integrated circuits (IC), discrete circuits, system on a chip (SOCs) circuits, microcontrollers), telecommunication circuits, hybrid circuits, and any other type of "circuit." In this regard, the exhaust analysis circuit 216, the reductant delivery circuit 220, and the diagnostic circuit 224 may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on). The exhaust analysis circuit 216, the reductant delivery circuit 220, and the diagnostic circuit 224 may also include programmable hardware devices such as field programmable gate arrays, programmable array logic, programmable logic devices or the like. The exhaust analysis circuit 216, the reductant delivery circuit 220, and the diagnostic circuit 224 may include one or more memory devices for storing instructions that are executable by the processor(s) of the exhaust analysis circuit 216, the reductant delivery circuit 220, and the diagnostic circuit 224. The one or more memory devices and processor(s) may have the same definition as provided below with respect to the memory device 212 and processor 208. In some hardware unit configurations, the exhaust analysis circuit 216, the reductant delivery circuit 220, and the diagnostic circuit 224 may be geographically dispersed throughout separate locations in the vehicle. Alternatively and as shown, the exhaust analysis circuit 216, the reductant delivery circuit 220, and the diagnostic circuit 224 may be embodied in or within a single unit/housing, which is shown as the controller 14.

In the example shown, the controller 14 includes a processing circuit 204 having the processor 208 and the memory device 212. The processing circuit 204 may be structured or configured to execute or implement the instructions, commands, and/or control processes described herein with respect to the exhaust analysis circuit 216, the reductant delivery circuit 220, and the diagnostic circuit 224. The depicted configuration represents the exhaust analysis circuit 216, the reductant delivery circuit 220, and the diagnostic circuit 224 as machine or computer-readable media. However, as mentioned above, this illustration is not meant to be limiting as the present disclosure contemplates other embodiments where the exhaust analysis circuit 216, the reductant delivery circuit 220, and the diagnostic circuit 224 or at least one circuit of the exhaust analysis circuit 216, the reductant delivery circuit 220, and the diagnostic circuit 224 is configured as a hardware unit. All such combinations and variations are intended to fall within the scope of the present disclosure.

The processor 208 may be implemented as one or more general-purpose processor, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the exhaust analysis circuit 216, the reductant delivery circuit 220, and the diagnostic circuit 224 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory device 212 (e.g., RAM, ROM, Flash Memory, hard disk storage) may store data and/or computer code for facilitating the various processes described herein. The memory device 212 may be communicably connected to the processor 208 to provide computer code or instructions to the processor 208 for executing at least some of the processes described herein. Moreover, the memory device 212 may be or include tangible, non-transient volatile memory or non-volatile memory. Accordingly, the memory device 212 may include database components, object code components, script components, or any other type of information structure for supporting the various activities and information structures described herein.

The communications interface 228 may include wired or wireless interfaces (e.g., jacks, antennas, transmitters, receivers, transceivers, wire terminals) for conducting data communications with various systems, devices, or networks. For example, the communications interface 228 may include an Ethernet card and port for sending and receiving data via an Ethernet-based communications network and/or a Wi-Fi transceiver for communicating via a wireless communications network. The communications interface 228 may be structured to communicate via local area networks or wide area networks (e.g., the Internet) and may use a variety of communications protocols (e.g., IP, LON, Bluetooth, ZigBee, radio, cellular, near field communication).

The communications interface 228 of the controller 14 may facilitate communication between and among the controller 14 and one or more components of the vehicle 10 (e.g., the engine 18, the exhaust aftertreatment system 22, the NOx sensors 52, 58, the bound reductant sensors 54, 56, the temperature sensor 60). Communication between and among the controller 14 and the components of the vehicle 10 may be via any number of wired or wireless connections (e.g., any standard under IEEE 802). For example, a wired connection may include a serial cable, a fiber optic cable, a CAT5 cable, or any other form of wired connection. In comparison, a wireless connection may include the Internet, Wi-Fi, cellular, Bluetooth, ZigBee, radio, etc. In one embodiment, a controller area network (CAN) bus provides the exchange of signals, information, and/or data. The CAN bus can include any number of wired and wireless connections that provide the exchange of signals, information, and/or data. The CAN bus may include a local area network (LAN), or a wide area network (WAN), or the connection may be made to an external computer (for example, through the Internet using an Internet Service Provider).

The exhaust analysis circuit 216 is structured to receive information indicative of characteristics of the exhaust gas from one or more of the sensors 52-60. Characteristics of the exhaust gas can include a NOx concentration, an amount of reductant bound to the SCR catalyst 34, and a temperature of the exhaust gas. In some embodiments, the characteristics are the amount of reductant bound to the SCR catalyst 34 and the outlet NOx concentration. In such an embodiment, the exhaust analysis circuit 216 is structured to receive information indicative of the amount of reductant bound to the SCR catalyst 34 from the bound reductant sensors 54, 56 and information indicative of the outlet NOx concentration from the second NOx sensor 58. In some embodiments, the exhaust analysis circuit 216 is structured to receive information indicative of first characteristics of the exhaust gas from one or more of the sensors 52-60 at a first time and to receive information indicative of second characteristics of the exhaust gas from one or more of the sensors 52-60 at a second time after the first time. In some embodiments, the exhaust analysis circuit 216 is structured to continuously receive information indicative of the characteristics of the exhaust gas from one or more of the sensors 52-60.

The exhaust analysis circuit 216 is structured to determine the concentration of NO, $NO_2$, and reductant in the exhaust gas and the amount of reductant bound to the SCR catalyst 34 by inputting the information indicative of the characteristics of the exhaust gas into a dynamic model 226 of the SCR catalyst 34. In some embodiments, the exhaust analysis circuit 216 is structured to determine the concentration of NO and $NO_2$ at, proximate, or upstream of the SCR catalyst 34. For example, it is advantageous to determine the concentrations of NO and $NO_2$ in the exhaust gas at, proximate, or upstream of the SCR catalyst 304 (e.g., the feed gas) to optimize an amount of reductant that is provided to the feed gas to provide enough reductant to covert the NOx in the exhaust gas into less harmful products while also consuming substantially all of the reductant injected into the exhaust gas. For example, as is described in greater detail below, NO reacts with the reductant more quickly than $NO_2$. Therefore, after determining, by the exhaust analysis circuit 216, the concentrations of NO and $NO_2$ in the feed gas, the controller 14 (e.g., with the reductant delivery circuit 220) controls an amount of reductant injected into the feed gas based on the actual concentrations of NO and $NO_2$ in the feed gas. The controller 14 can control the amount of reductant injected into the feed gas by increasing, maintaining, or decreasing an amount of reductant injected into the feed gas.

In some arrangements, the exhaust analysis circuit 216 continuously inputs the information indicative of the characteristics of the exhaust gas into the dynamic model 226 of the SCR catalyst 34. In some embodiments, the exhaust analysis circuit 216 is structured to input the information indicative of first characteristics of the exhaust gas at a first time and the information indicative of second characteristics of the exhaust gas at a second time after the first time into the dynamic model 226 of the SCR catalyst 34.

The dynamic model 226 of the SCR catalyst 34 is shown in Equation 1 below.

$$\begin{bmatrix} \dot{y}_1 \\ \dot{y}_2 \\ \dot{y}_3 \\ \dot{y}_4 \\ \dot{y}_5 \end{bmatrix} = \begin{bmatrix} a_{11} & a_{12} & 0 & 0 & 0 \\ a_{21} & a_{22} & 0 & 0 & 0 \\ a_{31} & 0 & a_{33} & 0 & 0 \\ a_{41} & 0 & a_{43} & a_{44} & 0 \\ a_{51} & 0 & 0 & 0 & a_{55} \end{bmatrix} \begin{bmatrix} y_1 \\ y_2 \\ y_3 \\ y_4 \\ y_5 \end{bmatrix} + \begin{bmatrix} 0 \\ b_{23} \\ 0 \\ 0 \\ 0 \end{bmatrix} [u_3] + \begin{bmatrix} 0 & 0 \\ 0 & 0 \\ b_{34} & 0 \\ 0 & b_{45} \\ 0 & 0 \end{bmatrix} \begin{bmatrix} u_4 \\ u_5 \end{bmatrix} \quad (1)$$

where $y_1$ is the amount of reductant bound to the SCR catalyst, $y_2$ is the concentration of reductant in the exhaust gas, $y_3$ is the concentration of NO in the exhaust gas, $y_4$ is the concentration of $NO_2$ in the exhaust gas, $y_5$ is the concentration of ammonium nitrate, $\dot{y}_1$ is the change in the amount of reductant bound to the SCR catalyst 34, $\dot{y}_2$ is the change in the concentration of reductant in the exhaust gas, $\dot{y}_3$ is the change in the concentration of NO in the exhaust gas, $\dot{y}_4$ is the change in the concentration of $NO_2$ in the exhaust gas, $\dot{y}_5$ is the change in the concentration of ammonium nitrate, $a_{11}$ is the dependency of ammonia storage dynamic change on the current value of stored reductant, $a_{12}$ is the dependency of reductant storage dynamic change on the current value of gas-phase reductant, $a_{21}$ is the dependency of gas-phase reductant dynamic change on the current value of stored reductant, $a_{22}$ is the dependency of gas-phase reductant dynamic change on the current value of gas-phase reductant, $a_{31}$ is the dependency of gas-phase NO dynamic change on the current value of stored reductant, $a_{33}$ is the dependency of gas-phase NO dynamic change on the current value of gas-phase NO, $a_{41}$ is the dependency of gas-phase $NO_2$ dynamic change on the current value of stored reductant, $a_{43}$ is the dependency of gas-phase $NO_2$ dynamic change on the current value of gas-phase NO, $a_{44}$ is the dependency of gas-phase $NO_2$ dynamic change on the current value of gas-phase $NO_2$, $a_{51}$ is the dependency of gas-phase ammonium nitrate dynamic change on the current value of stored reductant, $a_{55}$ is the dependency of gas-phase ammonium nitrate dynamic change on the current value of gas-phase ammonium nitrate, $b_{23}$ is the dependency of gas-phase reductant dynamic change on the entering gas-phase reductant (or, gas-phase reductant input to the SCR catalyst 34), $b_{34}$ is the dependency of gas-phase NO dynamic change on the entering gas-phase NO (or, gas-phase NO input to the SCR catalyst 34), $b_{45}$ is the dependency of gas-phase $NO_2$ dynamic change on the entering gas-phase $NO_2$ (or, gas-phase $NO_2$ input to the SCR catalyst 34), $u_3$ is the amount of reductant delivered into the exhaust gas by the dosing mechanism(s), $u_4$ is the amount of gas-phase NO entering the SCR catalyst 34 (not yet bound to the SCR catalyst 34), and $u_5$ is the amount of gas-phase $NO_2$ entering the SCR catalyst 34 (not yet bound to the SCR catalyst 34).

The model illustrated in Equation 1 illustrates the relations between the variables during the reactions of the NO, $NO_2$, and reductant in the exhaust gas with the reductant bound to the SCR catalyst 34. Equation 1 indicates that the concentrations of NO, $NO_2$, reductant, and bound reductant can be controlled by controlling an amount of reductant injected into the exhaust gas. Since NOx sensors are cross-sensitive to NO, $NO_2$, and $NH_3$, the concentrations of NO, $NO_2$, and $NH_3$ cannot be sensed individually. Therefore, the dynamic model 226 of the SCR catalyst 34 includes a set of measurement equations, Equation 2. The first row of Equation 2 shows that the sensor 56 directly measures the amount of reductant bound to the SCR catalyst 34. The second row of Equation 2 relates the variables $y_2$, $y_3$, and $y_4$ measured by the second NOx sensor 58. The NOx concentration sensed by the second NOx sensor 58 includes a combined amount of NO, $NO_2$, and reductant in the outlet exhaust gas. Equation 2 illustrates a relationship between measurements from the sensor 56, the sensor 58, and the variables $y_1$, $y_2$, $y_3$, $y_4$, and $y_5$.

$$\begin{bmatrix} z_1 \\ z_2 \end{bmatrix} = \begin{bmatrix} 1 & 0 & 0 & 0 & 0 \\ 0 & 1 & 1 & 1 & 0 \end{bmatrix} \begin{bmatrix} y_1 \\ y_2 \\ y_3 \\ y_4 \\ y_5 \end{bmatrix} \quad (2)$$

where $z_1$ the amount of ammonia bound to the SCR catalyst 34 and $z_2$ is the amount of NOx exiting the exhaust aftertreatment system 22 as measured by the second NOx sensor 58. The measured amount of NOx represented by the variable $z_2$ includes a mixture of three gas-phase components: NO, $NO_2$, and $NH_3$.

Using continuous-time observability method in system theory, observability of $y_1$, $y_2$, $y_3$, and $y_4$, can be developed from measurements of $z_1$-$z_2$ and time-derivative of $z_1$-$z_2$ measurements. Substituting Equation 1 for the derivatives of Equation 2 and combining it with Equation 2, yields Equation 3.

$$\begin{bmatrix} NH3_{s,t} \\ NH3_{g,t} \\ NO_{g,t} \\ NO2_{g,t} \end{bmatrix} = (z) \begin{bmatrix} RF_{s,t} \\ NO_{x,t} \\ --- \\ \dfrac{d}{dt}RF_{s,t} \\ \dfrac{d}{dt}NO_{x,t} \end{bmatrix}, \text{ where} \quad (3)$$

$$z = \left( \begin{array}{cccc} 1 & 0 & 0 & 0 \\ -\dfrac{a_{11}}{a_{12}} & 0 & \dfrac{1}{a_{12}} & 0 \\ -\dfrac{\begin{pmatrix} a_{12}a_{21} - a_{11}a_{22} + \\ a_{12}a_{31} + a_{12}a_{41} + a_{11}a_{44} \end{pmatrix}}{(a_{12}a_{33} + a_{12}a_{43} - a_{12}a_{44})} & -\dfrac{a_{44}}{a_{33} + a_{43} - a_{44}} & -\dfrac{a_{22} - a_{44}}{a_{12}a_{33} + a_{12}a_{43} - a_{12}a_{44}} & \dfrac{1}{a_{33} + a_{43} - a_{44}} \\ \dfrac{\begin{pmatrix} a_{12}a_{21} - a_{11}a_{22} + a_{12}a_{31} + \\ a_{11}a_{33} + a_{12}a_{41} + a_{11}a_{43} \end{pmatrix}}{(a_{12}a_{33} + a_{12}a_{43} - a_{12}a_{44})} & \dfrac{a_{33} + a_{43}}{a_{33} + a_{43} - a_{44}} & -\dfrac{a_{33} - a_{22} + a_{43}}{a_{12}a_{33} + a_{12}a_{43} - a_{12}a_{44}} & -\dfrac{1}{a_{33} + a_{43} - a_{44}} \end{array} \right),$$

where $RF_{s,t}$ is the amount of reductant bound to the SCR catalyst 34 at time t (e.g., measured by the sensor 56), $$\frac{d}{dt}RF_{s,t}$$

is the rate of change in the amount of reductant bound to the SCR catalyst 34 at time t measured by the sensor 56 (e.g., the incremental-time-change of the measurement of the sensor 56 that correlates to the rate-of-change of the amount of reductant bound to the SCR catalyst 34 at time t), $NOx_t$ is the outlet NOx concentration at time t, and $$\frac{d}{dt}NOx_t$$

is rate of change of the outlet NOx concentration at the time t. In some embodiments, the use of non-linear observer or filtering is used to compute the time derivatives of Equation 3 when process disturbance and measurement noise uncertainties are present.

The reductant delivery circuit 220 is structured to control (e.g., maintain, increase, or decrease) an amount of reductant injected into the exhaust gas based on the NO, $NO_2$, and reductant concentrations in the exhaust gas and the amount of reductant bound to the SCR catalyst 34 determined by the exhaust analysis circuit 216. The reductant delivery circuit 220 is structured to determine a ratio of NO to $NO_2$ entering the exhaust gas and control the amount of reductant injected into the exhaust gas based on the ratio of NO to $NO_2$. The use of the process model of Equation 1 along with the measurement model of Equation 2 allows the estimation of NO and $NO_2$ proportions using the outputs of an input reconstruction observer or an unknown input observer. Reduction of $NO_2$ is a slower process than reduction of NO, so in instances in which the NOx in the exhaust gas includes more $NO_2$ than NO, more reductant is required for NOx reduction. For example, in response to the NO to $NO_2$ ratio indicating that the concentration of NO in the exhaust gas is higher than the concentration of $NO_2$ in the exhaust gas, the reductant delivery circuit 220 is structured to command the reductant doser 40 to inject reductant into the exhaust gas at a ratio of 1 mole of reductant to one mole of NOx. In response to determining the NO to $NO_2$ ratio indicates that the concentration of $NO_2$ in the exhaust gas is higher than the concentration of NO in the exhaust gas, the reductant delivery circuit commands the reductant doser 40 to increase an amount of reductant injected into the exhaust gas, injecting more than 1 mole of reductant into the exhaust gas for every mole of NOx in the exhaust gas.

In some embodiments, the reductant delivery circuit 220 is structured to save the NO to $NO_2$ ratio to the memory 212. In such embodiments, after determining a NO to $NO_2$ ratio for a current time period, the reductant delivery circuit 220 is structured to compare the current NO to $NO_2$ ratio to the most recent previous NO to $NO_2$ ratio. In response to determining that the NO to $NO_2$ ratio indicates that the concentration of $NO_2$ in the exhaust gas is higher than the concentration of NO in the exhaust gas and that current concentration of $NO_2$ currently in the exhaust gas is lower than the previous concentration of $NO_2$ in the exhaust gas, the reductant delivery circuit 220 is structured to command the reductant doser 40 to reduce an amount of reductant injected into the exhaust gas.

The reductant delivery circuit 220 is structured to compare the concentration of reductant in the outlet exhaust gas (e.g., the exhaust gas leaving the SCR catalyst 34 and/or the exhaust aftertreatment system 22) to a predefined threshold. The reductant delivery circuit 220 is structured to control injection of the reductant into the exhaust gas based on the comparison. In response to determining that the concentration of reductant is at or above the predefined threshold, the reductant delivery circuit 220 determines that reductant slip is likely occurring. For example, in response to determining that reductant slip is likely occurring, the reductant delivery circuit 220 is structured to command the reductant doser 40 to inject less reductant into the exhaust gas. In response to the comparison indicating that the concentration of reductant in the exhaust gas is below the predefined threshold, the reductant doser 40 is structured to command the reductant doser 40 to maintain the amount of reductant injected into the exhaust gas.

The diagnostic circuit 224 is structured to determine one or more fault conditions of the exhaust aftertreatment system 22 based on the NO, $NO_2$, and reductant concentrations in the exhaust gas and the amount of reductant bound to the SCR catalyst 34 determined by the exhaust analysis circuit 216. For example, the diagnostic circuit 224 is structured to compare the NO to $NO_2$ ratio at or proximate the inlet of the SCR catalyst 34 to a predefined threshold. The predefined ratio is a NO to $NO_2$ ratio or a range of NO to $NO_2$ ratios that indicates that an amount of $NO_2$ in the exhaust at or proximate the inlet of the SCR catalyst 34 is low. In response to determining that the ratio of NO to $NO_2$ is at or above the predefined threshold (e.g., that an inadequate amount of $NO_2$ is present at or proximate the inlet of the SCR catalyst 34), the diagnostic circuit 224 is structured to initiate a DOC thermal management process when the system is operating at a temperature range that allows productive NO to $NO_2$ oxidation. In some embodiments, the diagnostic circuit 224 is structured to initiate the DOC thermal management process in response to determining that the ratio of NO to $NO_2$ has been at or above the predefined threshold for a predefined period of time. The DOC thermal management process can include operating the engine 18 to increase a temperature of the exhaust gas to a temperature at which contaminants (e.g., unburned hydrocarbons, soot, and other particulate matter) burn off of the DOC 26. In some operating conditions, a DOC thermal management process may not be possible. For example, DOC thermal management processes may not be possible when the engine 18 is operating at a low load and/or a low speed. In such embodiments, the diagnostic circuit 224 is structured activate a fault indicating that insufficient $NO_2$ is present at or proximate the inlet of the SCR catalyst 34. In some arrangements, activating a fault can include displaying a fault notification (e.g., turning on a fault indicator via the operator I/O device 62, displaying a verbal fault notification via the operator I/O device 62, making an acoustic fault notification via the operator I/O device 62, etc.).

Figure 3:
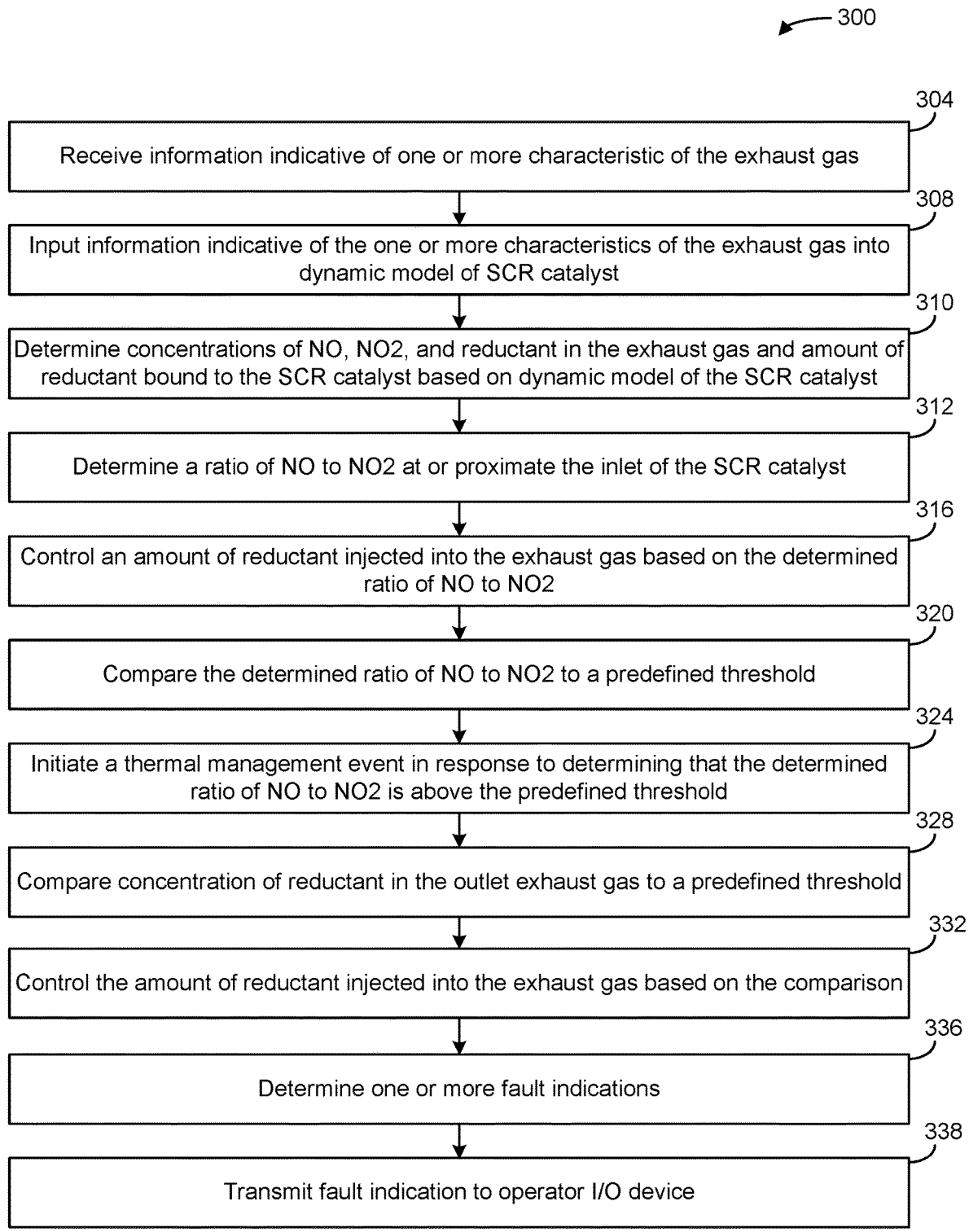
FIG. 3 is a flow diagram of a method for controlling reductant dosing based on NO, $NO_2$, and reductant concentrations in the exhaust gas and the amount of reductant bound to the SCR catalyst.

FIG. 3 illustrates an exemplary method 300 for determining the NO, $NO_2$, and reductant concentrations in the exhaust gas and the amount of reductant bound to the SCR catalyst 34 and controlling reductant dosing based on the NO, $NO_2$, and reductant concentrations in the exhaust gas and the amount of reductant bound to the SCR catalyst. At process 304, the exhaust analysis circuit 216 receives information indicative of characteristic of the exhaust gas from the sensors 52-60. For example, the exhaust analysis circuit 216 receives information indicative of the amount of reductant bound to the SCR catalyst 34 from the bound reductant sensors 54, 56 and information indicative of the concentration of NOx exiting the SCR catalyst 34 or the exhaust aftertreatment system 22 from the second NOx sensor 58.

At process 308, the exhaust analysis circuit 216 inputs the information indicative of the one or more characteristics of the exhaust gas into the dynamic model 226 to determine the NO, $NO_2$, and reductant concentrations in the exhaust gas and the amount of reductant bound to the SCR catalyst 34. In some embodiments, the exhaust analysis circuit 216 is structured to input information indicative of first characteristics of the exhaust gas at a first time and information indicative of second characteristics of the exhaust gas at a second time after the first time into the dynamic model 226 of the SCR catalyst 34. In some embodiments, the exhaust analysis circuit is configured to continuously input the information indicative of the characteristics of the exhaust gas into the dynamic model 226 of the SCR catalyst 34. In some embodiments, the characteristics of the exhaust are the amount of NOx bound to the SCR catalyst 34 and the information indicative of the outlet NOx concentration.

At process 310, the exhaust analysis circuit 216 determines the concentrations of NO, $NO_2$, and reductant in the exhaust gas and the amount of reductant bound to the SCR catalyst 34 based on the dynamic model 226 of the SCR catalyst 34. In some embodiments, the exhaust analysis circuit 216 determines the concentrations of NO, $NO_2$, and reductant in the exhaust gas at, proximate, or upstream of the SCR catalyst 34.

At process 312, the reductant delivery circuit 220 determines a ratio of NO to $NO_2$ at or proximate the inlet of the SCR catalyst 34 based on the NO concentration in the exhaust gas and the $NO_2$ concentration in the exhaust gas. At process 316, the reductant delivery circuit 220 controls (e.g., maintains, increases, or decreases) an amount of reductant injected into the exhaust gas based on the NO to $NO_2$ ratio. For example, in response to the NO to $NO_2$ ratio indicating that the concentration of NO in the exhaust gas is higher than the concentration of $NO_2$ in the exhaust gas, the reductant delivery circuit 220 commands the reductant doser 40 to inject reductant into the exhaust gas at a ratio of 1 mole of reductant to one mole of NOx. In response to determining the NO to $NO_2$ ratio indicates that the concentration of $NO_2$ in the exhaust gas is higher than the concentration of NO in the exhaust gas, the reductant delivery circuit 220 commands the reductant doser 40 to increase an amount of reductant injected into the exhaust gas, injecting more than 1 mole of reductant into the exhaust gas for every mole of NOx in the exhaust gas.

At process 320, the diagnostic circuit 224 compares the NO to $NO_2$ ratio at or proximate the inlet of the SCR catalyst 34 to a predefined threshold. The predefined ratio is a NO to $NO_2$ ratio or a range of NO to $NO_2$ ratios that indicates that an amount of $NO_2$ in the exhaust at or proximate the inlet of the SCR catalyst 34 is low. In some embodiments, the diagnostic circuit 224 initiates the DOC thermal management process in response to determining that the ratio of NO to $NO_2$ has been at or above the predefined threshold for a predefined period of time (e.g., an amount of $NO_2$ has been low relative to an amount of NO for the predefined period of time). At process 324, in response to determining that the ratio of NO to $NO_2$ is at or above the predefined threshold, the diagnostic circuit 224 initiates a DOC thermal management process. In some operating conditions, a DOC thermal management may not be possible. For example, DOC thermal management processes may not be possible when the engine 18 is operating at a low load and/or a low speed. In such arrangements, the diagnostic circuit 224 may activate a fault indicating that insufficient $NO_2$ is present at or proximate the inlet of the SCR catalyst 34. In some arrangements, activating a fault can include displaying a fault notification (e.g., turning on a fault indicator via the operator I/O device 62, displaying a verbal fault notification via the operator I/O device 62, making an acoustic fault notification via the operator I/O device 62, etc.).

At process 328, the reductant delivery circuit 220 compares the concentration of reductant in the outlet exhaust gas to a predefined threshold. In response to determining that the concentration of reductant is at or above the predefined threshold, the reductant delivery circuit 220 determines that reductant slip is likely occurring. At process 332, the reductant delivery circuit 220 controls injection of the reductant into the exhaust gas based on the comparison. For example, in response to determining that reductant slip is likely occurring, the reductant delivery circuit 220 commands the reductant doser 40 to inject less reductant to the exhaust gas. In response to the comparison indicating that the concentration of reductant in the exhaust gas is below the predefined threshold, the reductant delivery circuit 220 commands the reductant doser 40 to maintain the amount of reductant injected into the exhaust gas. Processes 328-332 can occur before, simultaneously with, or after Processes 312-316.

At process 336, the diagnostic circuit 224 determines one or more fault conditions of the exhaust aftertreatment system 22 based on the NO, $NO_2$, and reductant concentrations in the exhaust gas stream and the amount of reductant bound to the SCR catalyst 34 determined by the exhaust analysis circuit 216. At process 340, the diagnostic circuit 224 transmits a fault notification to the operator I/O device 62. For example, in response to determining that the ratio of NO to $NO_2$ is higher or lower than a predefined threshold, the diagnostic circuit 224 is structured to transmit a fault notification to the operator I/O device 62 to display to the operator of the vehicle 10. Processes 336-320 can occur before, simultaneously with, or after processes 312-332.

No claim element herein is to be construed under the provisions of 35 U.S.C. § 112(f), unless the element is expressly recited using the phrase "means for."

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional intermediate members. For example, circuit A communicably "coupled" to circuit B may signify that circuit A communicates directly with circuit B (i.e., no intermediary) or communicates indirectly with circuit B (e.g., through one or more intermediaries).

While various circuits with particular functionality are shown in FIG. 2 it should be understood that the controller 14 may include any number of circuits for completing the functions described herein. For example, the activities and functionalities of the circuits 216-224 may be combined in multiple circuits or as a single circuit. Additional circuits with additional functionality may also be included. Further, the controller 14 may further control other activity beyond the scope of the present disclosure.

As mentioned above and in one configuration, the "circuits" may be implemented in machine-readable medium for execution by various types of processors, such as the processor 208 of FIG. 2. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

Although the diagrams herein may show a specific order and composition of method steps, the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. All such modifications are intended to be included within the scope of the present disclosure as defined in the appended claims. Such variations will depend on the machine-readable media and hardware systems chosen and on designer choice. All such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A system comprising:
   an exhaust aftertreatment system including a selective catalytic reduction (SCR) catalyst in exhaust gas-receiving communication with an engine and at least one reductant dosing system structured to provide reductant to the exhaust gas;

a controller structured to:
　　determine a concentration of one or more of nitric oxide (NO) and nitrogen dioxide ($NO_2$) at or proximate an inlet of the exhaust aftertreatment system based on a dynamic model of the SCR catalyst, information indicative of a concentration of NOx at or proximate an outlet of the exhaust aftertreatment system, and information indicative of an amount of stored reductant in the SCR catalyst; and
　　command the at least one reductant doser to increase, decrease, or maintain an amount of reductant provided to the exhaust gas based on the determined concentration of one or more of NO and $NO_2$ in the exhaust gas.

2. The system of claim 1, wherein the controller is structured to:
　　determine a ratio of NO to $NO_2$ at or proximate an inlet of the SCR catalyst;
　　compare the ratio of NO to $NO_2$ to a threshold; and
　　initiate a diesel oxidation catalyst (DOC) thermal management process in response to the comparison indicating that the ratio of NO to $NO_2$ is above a threshold.

3. The system of claim 2, wherein the controller is structured to initiate the DOC thermal management process in response to the comparison indicating that the ratio of NO to $NO_2$ is above the threshold for a period of time.

4. The system of claim 1, wherein the controller is structured to determine a concentration of reductant in the exhaust gas and an amount of reductant bound to the SCR catalyst based on the dynamic model of the SCR catalyst, information indicative of the concentration of NOx at or proximate the outlet of the exhaust aftertreatment system, and information indicative of the amount of stored reductant in the SCR catalyst.

5. The system of claim 4, wherein the controller is structured to compare the concentration of reductant in the exhaust gas to a threshold and control injection of reductant into the exhaust gas based on the comparison.

6. The system of claim 1, wherein the controller is structured to determine a ratio of NO and $NO_2$ in the exhaust gas and command the at least one reductant doser to increase an amount of reductant provided to the exhaust gas in response to the ratio of NO to $NO_2$ indicating that the concentration of $NO_2$ is higher than the concentration of NO.

7. The system of claim 1, wherein the controller is structured to:
　　determine a current ratio of NO to $NO_2$ at or proximate an inlet of the SCR catalyst;
　　compare the current ratio of NO to $NO_2$ to a previous NO to $NO_2$ ratio;
　　in response to determining that the current NO to $NO_2$ ratio indicates that a current concentration of $NO_2$ is higher than a current concentration of NO and that the current concentration of $NO_2$ in the exhaust gas is lower than a previous concentration of $NO_2$ in the exhaust gas, reduce an amount of reductant injected into the exhaust gas.

8. An apparatus comprising:
an exhaust analysis circuit structured to:
　　receive, from a sensor, information indicative of a concentration of nitrogen oxide (NOx) at or proximate an outlet of an exhaust aftertreatment system; and
　　determine a concentration of one or more of nitric oxide (NO) and nitrogen dioxide ($NO_2$) at or proximate an inlet of the exhaust aftertreatment system based on a dynamic model of a selective catalytic reduction (SCR) catalyst of the exhaust aftertreatment system, the information indicative of the concentration of nitrous oxide (NOx) at or proximate the outlet of the exhaust aftertreatment system, and information indicative of an amount of stored reductant in the SCR catalyst, wherein the exhaust aftertreatment system includes the selective catalytic reduction (SCR) catalyst in exhaust gas-receiving communication with an engine and at least one reductant dosing system structured to provide reductant to the exhaust gas; and
a reductant delivery circuit structured to command the at least one reductant doser to increase, decrease, or maintain an amount of reductant provided to the exhaust gas based on the determined concentration of one or more of NO and $NO_2$ in the exhaust gas.

9. The apparatus of claim 8, wherein:
the exhaust analysis circuit is structured to:
　　determine a ratio of NO to $NO_2$ at or proximate an inlet of the SCR catalyst; and
　　compare the ratio of NO to $NO_2$ to a threshold; and
the reductant delivery circuit is structured to initiate a diesel oxidation catalyst (DOC) thermal management process in response to the comparison indicating that the ratio of NO to $NO_2$ is above a threshold.

10. The apparatus of claim 9, wherein the reductant delivery circuit is structured to initiate the DOC thermal management process in response to the comparison indicating that the ratio of NO to $NO_2$ is above the threshold for a period of time.

11. The apparatus of claim 8, wherein the exhaust analysis circuit is structured to determine a concentration of reductant in the exhaust gas and an amount of reductant bound to the SCR catalyst based on the dynamic model of the SCR catalyst, information indicative of the concentration of NOx at or proximate the outlet of the exhaust aftertreatment system, and information indicative of the amount of stored reductant in the SCR catalyst.

12. The apparatus of claim 11, wherein the reductant delivery circuit is structured to compare the concentration of reductant in the exhaust gas to a threshold and control injection of reductant into the exhaust gas based on the comparison.

13. The apparatus of claim 8, wherein the exhaust analysis circuit is structured to determine a ratio of NO and $NO_2$ in the exhaust gas and the reductant delivery circuit is structured to command the at least one reductant doser to increase an amount of reductant provided to the exhaust gas in response to the ratio of NO to $NO_2$ indicating that the concentration of $NO_2$ is higher than the concentration of NO.

14. The apparatus of claim 8, wherein:
the exhaust analysis circuit is structured to:
　　determine a current ratio of NO to $NO_2$ at or proximate an inlet of the SCR catalyst; and
　　compare the current ratio of NO to $NO_2$ to a previous NO to $NO_2$ ratio; and
the reductant delivery circuit is structured to reduce an amount of reductant injected into the exhaust gas in response to determining that the current NO to $NO_2$ ratio indicates that a current concentration of $NO_2$ is higher than a current concentration of NO and that the current concentration of $NO_2$ in the exhaust gas is lower than a previous concentration of $NO_2$ in the exhaust gas.

15. A method comprising:
receiving, from a sensor, information indicative of a concentration of nitrogen oxide (NOx) at or proximate an outlet of an exhaust aftertreatment system;
determining a concentration of one or more of nitric oxide (NO) and nitrogen dioxide ($NO_2$) at or proximate an inlet of the exhaust aftertreatment system, the exhaust aftertreatment system including a selective catalytic reduction (SCR) catalyst in exhaust gas-receiving communication with an engine and at least one reductant dosing system structured to provide reductant to the exhaust gas based on a dynamic model of the SCR catalyst, the information indicative of the concentration of nitrous oxide (NOx) at or proximate the outlet of the exhaust aftertreatment system, and information indicative of an amount of stored reductant in the SCR catalyst; and
commanding the at least one reductant doser to increase, decrease, or maintain an amount of reductant provided to the exhaust gas based on the determined concentration of one or more of NO and $NO_2$ in the exhaust gas.

16. The method of claim 15, further comprising:
determining a ratio of NO to $NO_2$ at or proximate an inlet of the SCR catalyst;
comparing the ratio of NO to $NO_2$ to a threshold; and
initiating a diesel oxidation catalyst (DOC) thermal management process in response to the comparison indicating that the ratio of NO to $NO_2$ is above a threshold.

17. The method of claim 16, further comprising initiating the DOC thermal management process in response to the comparison indicating that the ratio of NO to $NO_2$ is above the threshold for a period of time.

18. The method of claim 15, further comprising determining a concentration of reductant in the exhaust gas and an amount of reductant bound to the SCR catalyst based on the dynamic model of the SCR catalyst, information indicative of the concentration of NOx at or proximate the outlet of the exhaust aftertreatment system, and information indicative of the amount of stored reductant in the SCR catalyst.

19. The method of claim 18, further comprising comparing the concentration of reductant in the exhaust gas to a threshold and control injection of reductant into the exhaust gas based on the comparison.

20. The method of claim 15, further comprising determining a ratio of NO and $NO_2$ in the exhaust gas and commanding the at least one reductant doser to increase an amount of reductant provided to the exhaust gas in response to the ratio of NO to $NO_2$ indicating that the concentration of $NO_2$ is higher than the concentration of NO.

* * * * *